(12) United States Patent
Mahan et al.

(10) Patent No.: US 6,224,363 B1
(45) Date of Patent: May 1, 2001

(54) SYSTEM FOR LOADING RAW MATERIAL AND UNLOADING FINISHED PARTS FROM A COMPRESSION MOLD

(75) Inventors: Clark D. Mahan, Cadillac; Bruce Killingbeck, Leroy, both of MI (US)

(73) Assignee: Pilot Industries, Inc., Dexter, MI (US)

( * ) Notice: Subject to any disclaimer, the term of this patent is extended or adjusted under 35 U.S.C. 154(b) by 0 days.

(21) Appl. No.: 09/354,277

(22) Filed: Jul. 15, 1999

(51) Int. Cl.[7] .................. B29C 43/34; B29C 43/50
(52) U.S. Cl. .................. 425/126.1; 425/403.1; 425/444; 198/346.2
(58) Field of Search .................. 425/126.1, 403.1, 425/444; 198/346.2

(56) References Cited

U.S. PATENT DOCUMENTS

| | | | | |
|---|---|---|---|---|
| 4,462,786 | * | 7/1984 | Perryman | 425/403.1 |
| 4,470,741 | * | 9/1984 | Bossler et al. | 425/403.1 |
| 4,571,320 | * | 2/1986 | Walker | 425/403.1 |
| 5,297,897 | * | 3/1994 | Venrooij et al. | 425/126.1 |
| 5,401,154 | * | 3/1995 | Sargent | 425/126.1 |
| 5,527,174 | * | 6/1996 | Godin et al. | 425/126.1 |
| 5,824,246 | * | 10/1998 | Reetz | 425/384 |
| 5,972,279 | * | 10/1999 | Harris et al. | 425/126.1 |
| 6,050,802 | * | 4/2000 | Kobayashi | 425/126.1 |
| 6,086,808 | * | 7/2000 | Sorensen et al. | 425/444 |

* cited by examiner

Primary Examiner—Harold Pyon
Assistant Examiner—ThuKhanh T. Nguyen
(74) Attorney, Agent, or Firm—Gifford, Krass, Groh, Sprinkle, Anderson & Citkowski, P.C.

(57) ABSTRACT

A system is provided for unloading finished parts from and also loading new raw material into a compression mold having two halves in which the mold halves are in a spaced apart position. The system includes an elongated endless conveyor which extends laterally away from the mold halves. An unloader platform is secured to and spaced upwardly from the conveyor so that an opening is formed between the platform and the conveyor. Raw material is positioned on the conveyor such that, upon actuation of the conveyor, the raw material passes under the platform. The conveyor is mounted on rails while an actuator moves the conveyor between an extended position, in which the platform is positioned in between the mold halves, and a retracted position, in which the conveyor as well as the platform is spaced laterally from the mold halves. The conveyor is actuated in synchronism with the actuator so that the conveyor moves the raw material under the platform and into the mold halves while, simultaneously, a completed part is ejected onto and supported by the platform.

8 Claims, 2 Drawing Sheets

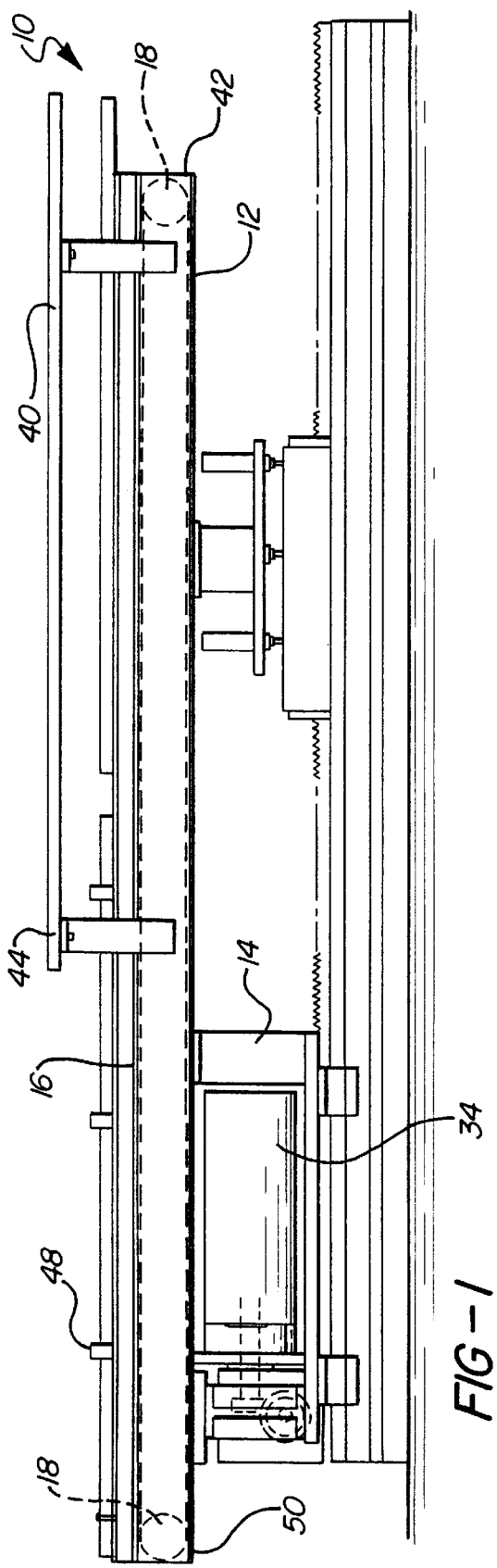
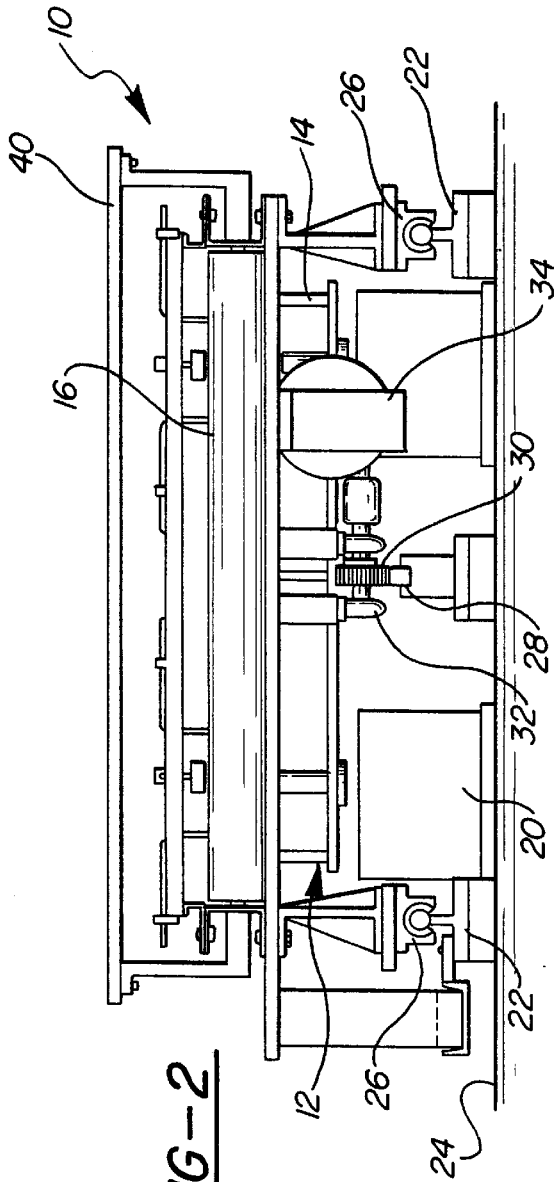

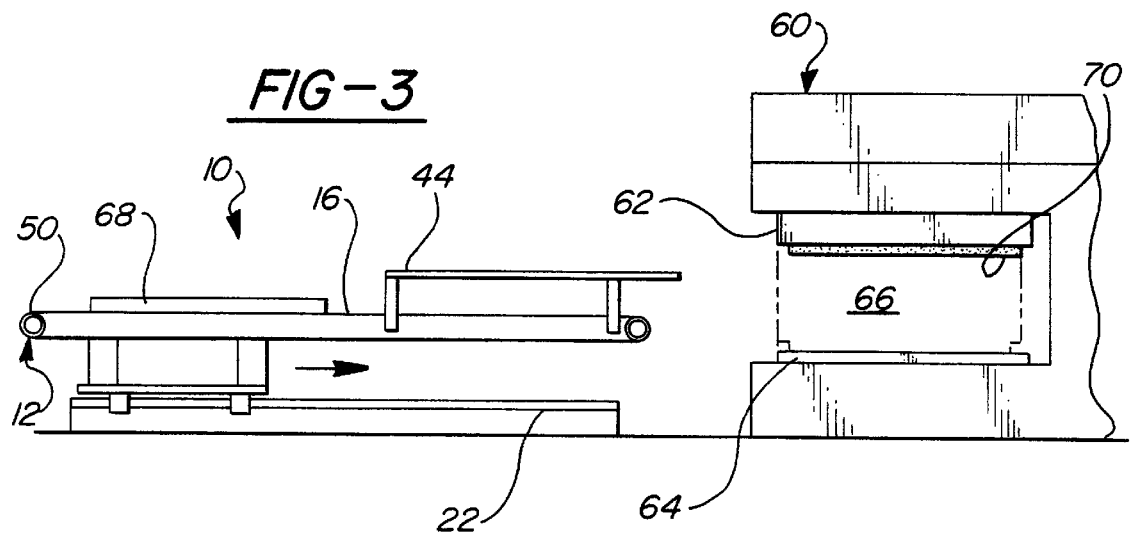
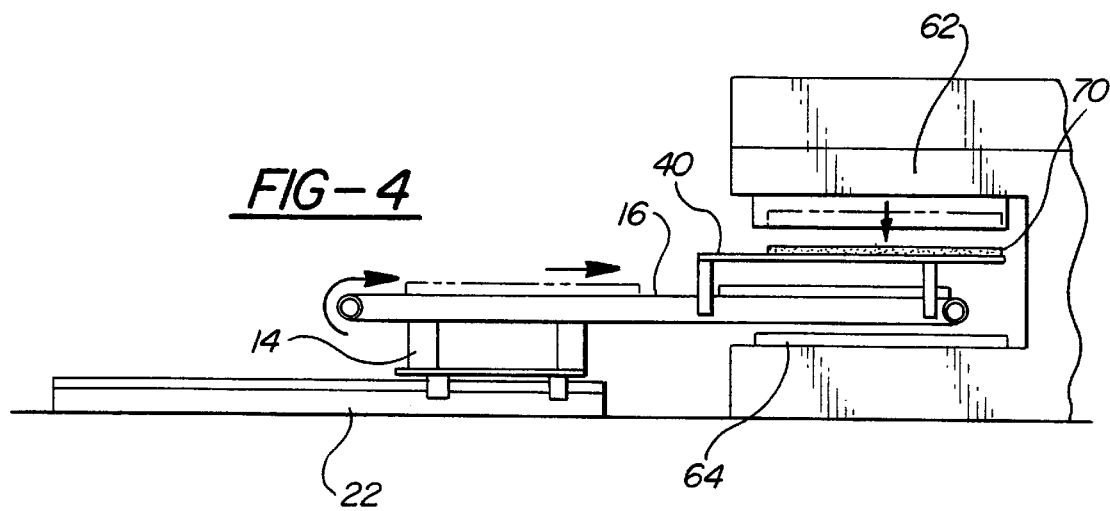
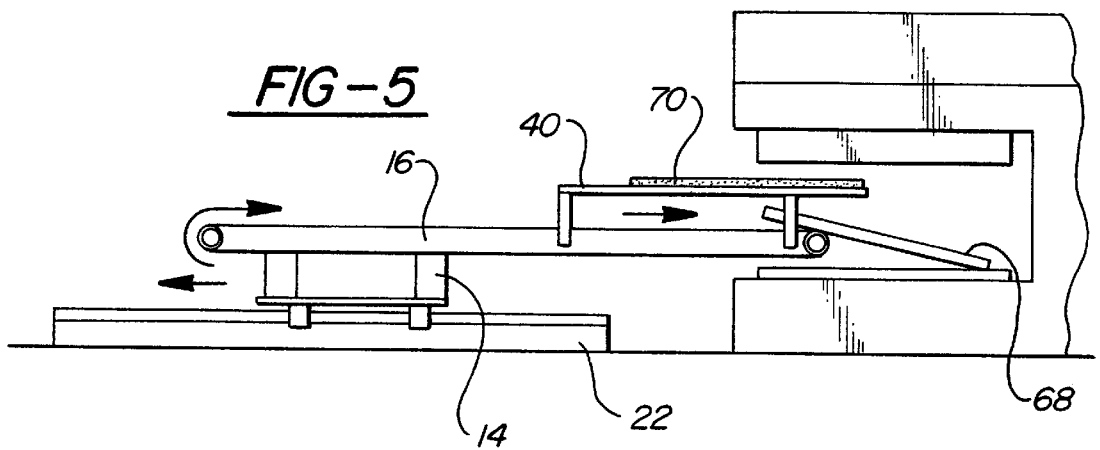

SYSTEM FOR LOADING RAW MATERIAL AND UNLOADING FINISHED PARTS FROM A COMPRESSION MOLD

BACKGROUND OF THE INVENTION

1. Field of the Invention

The present invention relates generally to conveyors and, more particularly, to a conveyor for simultaneously loading raw material into and removing finished parts from a compression mold.

2. Description of the Prior Art

Compression molds are used for manufacturing many different types of parts, such as panels for the automotive industry. In such a compression mold, the mold includes two halves which are moved between an open and a closed position. In their open position, finished parts are removed from the mold and, similarly, new raw material is positioned in between the mold halves. With the raw material positioned in between the mold halves, the mold halves are moved together to their closed position thus applying pressure to the raw material contained between the mold halves. In doing so, the heat formed by the compression of the raw material between the mold halves causes the raw material to flow into the chamber formed between the mold halves. The mold chamber corresponds in shape to the desired shape of the finished part.

Following completion of the molding operation, the mold halves are again moved to their open position whereupon the finished part is removed from the mold and, thereafter, new raw material is placed in between the mold halves whereupon the above procedure is repeated.

As in most manufacturing operations, the cycle time of the molding operation, i.e. the time required to complete one molding operation, should be as minimal as possible in order to maximize manufacturing efficiency. However, the previously known methods for both unloading finished parts from the mold, as well as loading new raw material into the mold in preparation for the next molding operation, has been slow and has increased the overall cycle time of the molding operation. This in turn has decreased manufacturing efficiency.

SUMMARY OF THE PRESENT INVENTION

The present invention provides a system for both unloading finished parts from the mold as well as loading new raw material into the mold in preparation for the next molding operation which overcomes all of the above-mentioned disadvantages of the previously known systems.

In brief, the system of the present invention is designed for use with a conventional compression mold having two mold halves which are movable between a spaced apart or open position and a closed position. With the mold halves in their open position, finished parts are removed from the mold and new raw material is positioned in between the mold halves in preparation for the next molding operation.

The system of the present invention comprises an elongated conveyor which extends laterally outwardly from the mold and has one end aligned with the space between the mold halves when the mold halves are in their open position. The conveyor comprises a conveyor frame and preferably a conveyor belt longitudinally movably mounted to the frame. A motor is selectively actuated to longitudinally move the conveyor belt relative to the conveyor frame.

A platform is secured to the conveyor frame between an intermediate point of the conveyor frame and the end of the conveyor frame adjacent the end nearest the mold. This platform, furthermore, is spaced upwardly from the conveyor belt so that material positioned on the conveyor belt, upon actuation of the conveyor motor, passes underneath the platform.

The conveyor frame in turn is longitudinally slidably mounted on rails so that the conveyor frame is movable between an extended position, in which the platform is positioned in between the mold halves when in their open position, and a retracted position, in which the entire conveyor frame together with the platform is spaced laterally outwardly away from the mold halves. An actuator, such as an hydraulic or electric actuator, is selectively activated to move the conveyor frame between its extended and its retracted position.

In operation and assuming that the conveyor frame is in its retracted position and that the mold halves are in their closed position and performing a molding operation, raw material is positioned on the conveyor between the end of the conveyor most spaced from the mold and the platform. Preferably, a framing arrangement is associated with the conveyor to facilitate the proper placement of the raw material onto the conveyor belt in order to assure that the mold is properly filled with the raw material.

Following completion of the molding operation, the mold halves are moved to their open position thus forming a space between the mold halves which is aligned with the first end of the conveyor. The actuator and conveyor motor are then both simultaneously actuated. In doing so, the platform is moved into a position in between the mold halves and simultaneously the raw material contained on the conveyor belt passes underneath the platform. With the platform positioned in between the mold halves, the completed part or parts from the mold are ejected from the upper mold half onto the platform. At this time, the raw material contained on the conveyor belt has been moved from its end most spaced from the mold halves and to a position underneath the platform.

The actuator is then again actuated in the reverse direction thus moving the conveyor and platform away from the mold. Simultaneously, the conveyor motor continues its forward actuation which effectively places the raw material contained on the conveyor belt in between the mold halves simultaneously as the conveyor is moved by the actuator towards its retracted position. When the conveyor reaches its retracted position, all of the raw material contained on the conveyor belt has been placed between the mold halves while the finished part or parts are supported by the platform. The mold halves are then moved to their closed position to perform the next molding operation. During this next molding operation, the finished parts are removed from the platform, new raw material is positioned on the conveyor belt, and the above process is repeated.

Since the system of the present invention simultaneously unloads the finished parts from the compression mold and loads new raw material into the compression mold, even during the time that the conveyor is moved towards its retracted position, the overall cycle time for both unloading finished parts and loading new raw material in between the mold halves is minimized. This in turn increases the overall efficiency of the molding operation.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a side view illustrating the preferred embodiment of the present invention;

FIG. 2 is an end view illustrating the preferred embodiment of the present invention; and FIGS. 3–5 are diagrammatic views illustrating the operation of the preferred embodiment of the present invention.

DETAILED DESCRIPTION OF A PREFERRED EMBODIMENT OF THE PRESENT INVENTION

With reference first to FIGS. 1 and 2, a preferred embodiment of the loading and unloading system 10 of the present invention is there shown and comprises an elongated conveyor 12 having a conveyor frame 14. An endless belt 16 is rotatably mounted on the frame 14 by rollers 18. A conventional conveyor motor 20 (illustrated only diagrammatically) is operatively coupled with the conveyor 16 by any conventional means such that, upon actuation of the motor 20, the conveyor belt 16 is longitudinally driven. The conveyor motor 20, furthermore, can be any type of conventional motor, such as an electric motor, hydraulic motor or the like, and is selectively activated.

Still referring to FIGS. 1 and 2, a pair of elongated rails 22 are supported on a ground support surface 24 such that one rail 22 extends longitudinally underneath each side of the conveyor frame 14. The conveyor frame 14, in turn, includes guides 26 such that the guides 26 are longitudinally slidably mounted on the rails 22. The coaction between the guides 26 and rails 22 thus enables the conveyor frame 14 to longitudinally slide along the rails 22.

An elongated gear rack 28 is supported on the ground support surface 24 and extends longitudinally along the conveyor frame 14. Preferably, as best shown in FIG. 2, the rack 28 is positioned in between the conveyor rails 22 although, alternatively, the gear rack can be positioned at any desired position relative to the rails 22. This rack 28, furthermore, extends substantially along the entire length of the rails 22.

A pinion 30, best shown in FIG. 2, is rotatably mounted to the conveyor frame 14 by bearings 32 such that the pinion 30 meshes with the gear rack 28. A motor 34, such as an electric or hydraulic motor, is drivingly connected to the pinion 30. The motor 34 is a reversible motor such that, upon actuation of the motor in a first direction, the motor 34 drives the pinion 30 and thus longitudinally displaces the conveyor frame 14 along the rails 22 in a first direction. Conversely, actuation of the motor 34 in the opposite direction longitudinally displaces the conveyor frame 14 in the opposite direction along the rails 22.

Still referring to FIGS. 1 and 2, a generally planar platform 40 is secured to the conveyor frame 14 such that the platform 40 extends from one end 42 of the conveyor 12 and to an intermediate point 44 of the conveyor 12. The platform 40, furthermore, is spaced upwardly from the belt 16 for a reason to be subsequently described.

A loading frame 48 is preferably secured to the conveyor frame 14 between the midpoint 44 of the conveyor 12 and an end 50 of the conveyor 12 opposite from the conveyor end 42. The frame 48 is conventional in construction and defines preset openings for properly aligning raw material onto the conveyor belt 16 to ensure that the mold is properly filled with the raw material.

With reference now to FIGS. 3–5, the operation of the present invention will now be described. The loading and unloading system 10 of the present invention is designed for use with a compression mold 60 having an upper mold half 62 and a lower mold half 64. These mold halves 62 and 64 are movable between an open position, illustrated in solid line in FIG. 3, and a closed position, illustrated in phantom line in FIG. 3. With the mold halves 62 and 64 in their open position, the finished part or parts from the prior molding operation are removed from between the mold halves and new raw material is positioned in between the mold halves 62 and 64 for the next subsequent molding operation. The compression mold 60 is conventional in construction so that a further description thereof is unnecessary.

The rails 22 are positioned relative to the mold 60 so that, with the mold halves 62 and 64 in their open position, the conveyor 12 is aligned with the space 66 between the mold halves 62 and 64.

With reference first to FIG. 3, during a molding operation, i.e. when the mold halves 62 and 64 are in their closed position, the conveyor 12 is moved on the rails 22 to a retracted position such that the entire conveyor 12 is laterally spaced from the mold halves. At this time, both the conveyor belt motor 20 and conveyor motor 34 are deactivated so that the conveyor 12 as well as the conveyor belt 16 are stationary. At this time, raw material 68 is loaded onto the top of the conveyor belt between the outer conveyor end 50 and midpoint 44, preferably using the frame 48 (FIG. 1).

Still referring to FIG. 3, after the raw material 68 is positioned on the conveyor belt 16, the molding operation is completed. Upon completion of the molding operation, the mold halves 62 and 64 are moved to their open position as shown in solid line in FIG. 3. The mold halves 62 and 64, furthermore, are designed so that a finished part 70 is temporarily held by the upper mold half 62.

With reference now to FIG. 4, both the conveyor motor 20 and actuator 34 are simultaneously actuated thus longitudinally moving the conveyor belt 16 and conveyor frame 14 longitudinally toward the mold and to the position illustrated in FIG. 4. In this position, since the platform 40 is positioned above the conveyor belt, the raw material 16 moves under the platform 40 while the platform 40 is positioned in the space 66 between the now open mold halves 62 and 64 and thus under the completed part 70. At this time, the motor 34 is deactivated and the finished part 70 ejected from the mold half 62 and onto the platform 40.

With reference now to FIG. 5, following ejection of the finished part 70 onto the platform 40, the motor 34 is activated in the opposite direction thus moving the conveyor frame 14 along the rails from its extended position (FIG. 4) and towards its retracted position (FIG. 3). Simultaneously, the motor 20 continues to longitudinally displace the conveyor belt 16 thus dumping or ejecting the raw material 68 into the mold 60 during the retraction stroke of the conveyor frame 14. Once the conveyor reaches its fully retracted position (FIG. 3), the mold halves 62 and 64 are again moved to their closed position thus performing the molding operation. During this molding operation, the finished part 70 is removed from the platform 40, new raw material 68 is positioned on the conveyor belt 16 and, when the molding operation is completed and the mold halves moved to their open position, the above process is repeated.

From the foregoing, it can be seen that the present invention provides an improved system for loading raw material into, and removing finished parts from, a compression mold. Since the conveyor 12 simultaneously loads the raw material into the mold during the retraction stroke of the conveyor and the removal of the finished part from the mold, a very short cycle time for both unloading the finished parts and loading new raw material into the mold is achieved.

Having described my invention, however, many modifications thereto will become apparent to those skilled in the art to which it pertains without deviation from the spirit of the invention as defined by the scope of the appended claims.

We claim:

1. A system for unloading finished parts from and for loading raw material into a mold having two mold halves when said mold halves are in a spaced apart position comprising:

an elongated endless conveyor having a frame extending laterally away from said mold and an endless belt movably mounted to said frame, said conveyor being aligned with an opening between said mold halves when said mold halves are in said spaced apart position, an unloader platform secured to and spaced upwardly from said conveyor frame so that an opening is formed between said platform and said conveyor belt, said platform extending along a first longitudinal portion of said conveyor frame extending from a first end adjacent said mold to an intermediate point on said conveyor, said conveyor frame having a second longitudinal portion on which raw material is positioned, said second longitudinal portion of said conveyor extending from said intermediate point to a second end of said conveyor most spaced from said mold, an actuator for moving said conveyor between an extended position in which said platform is positioned between said mold halves and a retracted position in which said first end of said conveyor is spaced laterally outwardly from said mold halves, means for simultaneously energizing said conveyor belt in synchronism with said actuator so that the conveyor belt moves the raw material positioned on said conveyor belt second portion when said conveyor is in said retracted position to a position in which the raw material is positioned under said platform as said actuator moves said conveyor from said retracted to said extended position, and for expelling raw material from said first end of said conveyor in synchronism with movement of said conveyor by said actuator from said extended to said retracted position.

2. The invention as defined in claim 1 wherein said conveyor is an endless belt conveyor.

3. The invention as defined in claim 1 and comprising at least one slide rail extending laterally outwardly from the mold, said conveyor being slidably mounted to said rails between said extended and said retracted positions.

4. The invention as defined in claim 1 wherein said actuator comprises an electric motor.

5. The invention as defined in claim 1 wherein said actuator comprises a hydraulic actuator.

6. The invention as defined in claim 1 and comprising a raw material positioning frame overlying said second portion of said conveyor.

7. The invention as defined in claim 1 and means attached to said conveyor for positioning an insert between said mold halves.

8. The invention as defined in claim 7 where said insert is a foil insert.

* * * * *